(12) United States Patent
Jiang et al.

(10) Patent No.: US 8,591,074 B1
(45) Date of Patent: Nov. 26, 2013

(54) SECONDARY OPTICAL LENS

(75) Inventors: Jin Bo Jiang, Hong Kong (CN); Wen Da Jiang, Hong Kong (CN)

(73) Assignee: Top International Enterprise Limited, Hong Kong (CN)

( * ) Notice: Subject to any disclaimer, the term of this patent is extended or adjusted under 35 U.S.C. 154(b) by 0 days.

(21) Appl. No.: 13/604,203

(22) Filed: Sep. 5, 2012

(51) Int. Cl.
*F21V 5/00* (2006.01)

(52) U.S. Cl.
USPC ................ 362/311.02; 362/311.06

(58) Field of Classification Search
USPC ............. 362/311.02, 311.03, 311.04, 311.05, 362/311.06, 311.08, 311.09, 326
See application file for complete search history.

(56) References Cited

U.S. PATENT DOCUMENTS

| | | | |
|---|---|---|---|
| 8,246,216 B2 * | 8/2012 | Jiang et al. | 362/308 |
| 2011/0096553 A1 * | 4/2011 | Shimokawa | 362/311.02 |
| 2012/0212965 A1 * | 8/2012 | Nakamura et al. | 362/311.09 |

* cited by examiner

*Primary Examiner* — Laura Tso
(74) *Attorney, Agent, or Firm* — Schiff Hardin LLP

(57) ABSTRACT

A secondary optical lens is invented for use in LED wall wash lights. The secondary optical lens includes a concave body that has an outer surface that extends from a base plane to a top plane, the so-called outer surface is comprised with a diamond-texture flake reflection pattern. Furthermore, the secondary optical lens includes a light incidence surface extending upward from the base plane of the concave body, the so-called light incidence surface includes a cylindrical plane of incidence and an aspheric plane of incidence on top of the cylindrical plane of incidence. And there is a light emitting surface at the top plane of the concave body having a sinusoidal waveform stripe-texture.

20 Claims, 13 Drawing Sheets

Y-Y SECTION

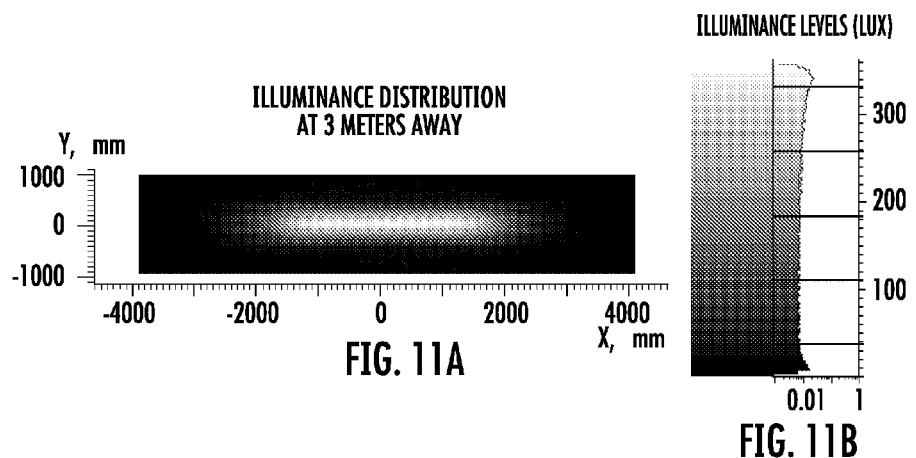
FIG. 11A
FIG. 11B
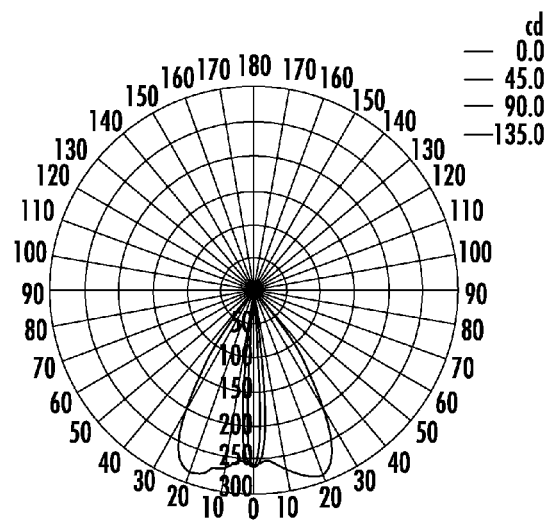
FIG. 12

SECONDARY OPTICAL LENS

TECHNICAL FIELD

The present disclosure generally relates to an LED lens for wall wash lighting, and, more particularly, to a secondary optical lens designed to mix light beams uniformly within a small angle to produce uniform illumination and consistent color temperature on a wall surface.

BACKGROUND OF THE INVENTION

Wall wash lighting generally refers to light fittings used to illuminate a large area of wall surface. It is primarily used for external building wall illumination, scenery illumination, advertisement sign illumination, cultural facility illumination, and the like. In addition, it is also widely applied in atmospheric illumination at sites such as hotel lobbies, ballrooms and bars.

In recent years, LED wall wash lights have been widely applied at various sites, and the scope involved has also become increasingly broader, for example, from indoor to outdoor and from localized lighting to overall lighting. Moreover, wall wash lights are used at continuously enhanced and developed levels. If these recent trends continue, LED wall wash lights will likely develop into an indispensable portion of lighting engineering. It is expected that LED wall wash lights will develop into small, delicate and portable in volume, and will mainly be based on high-power LED light sources. Generally, LED wall wash lighting is implemented using a long bar (i.e., a "light bar") having a plurality of LEDs mounted linearly in a plastic housing or the like.

For certain wall wash lighting applications, secondary optical lenses need to be provided for the LEDs to distribute the light beams according to certain desired characteristics. The design principle for secondary optical lenses are generally as follows: The total reflection collimating lens is first used to converge the light beams emitted from the LED to a very small light beam angle, and then the light beams are diffused at a wide-angle towards the wall surface through a line-shaped light distribution curved surface at the top of the lens, while very small light beam angle is unchanged in the direction perpendicular to the wall surface. As a result, most of the light beams can be gathered on the wall surface. One drawback of conventional secondary optical lenses, however, is that because the total reflection curved surface of the external face is smooth, when the fluorescent powder of the LED chip is not coated uniformly, the lenses can produced different color temperatures at different heights on the wall surface due to prism dispersion effects. For example, the color at lower heights on the wall surface adjacent to the LED light source tends to be slightly blue, while the color at higher wall heights tends to be slightly yellow. Accordingly, there is a need for an LED wall wash light lens that can mix light beams uniformly within a small angle to produce uniform illumination and consistent color temperature on the wall surface.

BRIEF SUMMARY OF THE INVENTION

In accordance with an aspect of the disclosure herein, a secondary optical lens is provided for use in LED wall wash lights. The secondary optical lens includes a concave body that has an outer surface that extends from a base plane to a top plane and has an outer surface with a diamond-texture flake reflection pattern. Furthermore, the secondary optical lens includes a light incidence surface extending upward from the base plane of the concave body and having a cylindrical plane of incidence and an aspheric plane of incidence on top of the cylindrical plane of incidence and a light emitting surface at the top plane of the concave body having sinusoidal waveform stripe-texture.

In another aspect, the secondary optical lens further comprises a flange adjacent to the light emitting surface and having at least one positioning pin.

In another aspect, the cylindrical plane of incidence has draft angles in a range between 1° and 7° relative to the optical axis of the secondary optical lens.

In another aspect, the cylindrical plane of incidence is configured to collect light beams emitted from an LED, which is positioned below the aspheric plane of incidence, at an angle between 30° and 90° relative to the optical axis of the secondary optical lens, and further configured to refract the light beams to the outer surface.

In another aspect, the diamond-texture flake reflection pattern totally reflects the light beams and is configured to mix the light beams at the small angle range of ±3°-±5°.

In another aspect, the aspheric plane of incidence is configured to collect light beams emitted from an LED, which is positioned below the aspheric plane of incidence, at an angle between 0° and 30° relative to the optical axis of the secondary optical lens, and further configured to converge the light beams, and wherein the converged light beams fall as incident light beams on the light emitting surface.

In another aspect, the sinusoidal waveform stripe-texture of the light emitting surface diffuses and distributes the light beams perpendicularly to the stripes, and wherein the output light beams are spread at the range larger than 45° to 75°.

In another aspect, the outer surface having the diamond-texture flake reflection pattern is between 0.5 mm to 5 mm from the base plane to the top plane, and where each flake plane increases in size at positions closer to the top plane.

In another aspect, light beams emitted from a center point of an LED, which is positioned below the aspheric plane of incidence, fall as incident light beams on a center point position of a flake of the diamond-texture flake reflection pattern after passing through the cylindrical plane of incidence, and wherein emergent light after reflection is collimated and emitted in a direction parallel to the optical axis of the secondary optical lens.

In another aspect, additional light beams refracted by the cylindrical plane of incidence fall as additional incident light beams, respectively, on upper and lower edge points of a flake of the diamond-texture flake reflection pattern, and wherein emergent light beams after reflection have an angle of diffusion between approximately 3° and 5°.

In another aspect, the aspheric plane of incidence is configured to distribute light beams emitted from an LED, which is positioned below the aspheric plane of incidence, in a range of 0° and 45°.

In another aspect, the aspheric plane of incidence comprises one of a smooth surface, a frosted surface, or a micro-lens array surface with light beam mixing effects.

In another aspect, the aspheric plane of incidence comprises an angle of incidence θ1 and a corresponding angle of emergence δi that satisfy the following conditions:

$$\delta i = \tan^{-1}\left[\frac{\theta 1 \cdot \sin\delta \cdot \sin\theta\text{beam}}{30° \ \sin(\theta\text{beam} + \delta) - \theta 1 \cdot \sin\delta \cdot \cos\theta\text{beam}}\right].$$

In another aspect, the stripe-texture of the light emitting surface has a light distribution principle in which for an $i^{th}$ incident light beam within a first one-eighth period of the sine wave, the angle of emergence ψi for a corresponding $i^{th}$ output light beam satisfies the following distribution conditions:

$$\psi_i = \tan^{-1}\left(\frac{i}{n} \cdot \tan\psi_{max}\right).$$

In another aspect, the stripe-texture of the light emitting surface has a light distribution principle in which for an $i^{th}$ incident light beam within a second one-eighth period of the sine wave, the angle of emergence ψi for a corresponding $i^{th}$ output light beam satisfies the following distribution conditions:

$$\psi_i = \tan^{-1}\left(\frac{n-i}{n} \cdot \tan\psi_{max}\right).$$

In another aspect, the angle of emergence ψi is in range of 45°≤2Ψmax≤75°.

In another aspect, the secondary optical lens further comprises a flange that is square, hexagonal or round.

In another aspect, the light emitting surface of the secondary optical lens is inclined with respect to the top plane.

In another aspect, the light emitting surface of the secondary optical lens is concave with respect to the top plane.

In another aspect, the light emitting surface of the secondary optical lens is convex with respect to the top plane.

BRIEF DESCRIPTION OF THE DRAWINGS

The figures are for illustration purposes only and are not necessarily drawn to scale. The invention itself, however, may best be understood by reference to the detailed description which follows when taken in conjunction with the accompanying drawings in which:

FIGS. 11A and 11B illustrate a light spot shape emitted by a light bar having a plurality of secondary optical lenses in accordance with an exemplary embodiment.

FIG. 12 illustrates an exemplary light intensity far-field angle distribution for the secondary optical lens in accordance with an exemplary embodiment.

DETAILED DESCRIPTION OF THE INVENTION

Figure 1A:
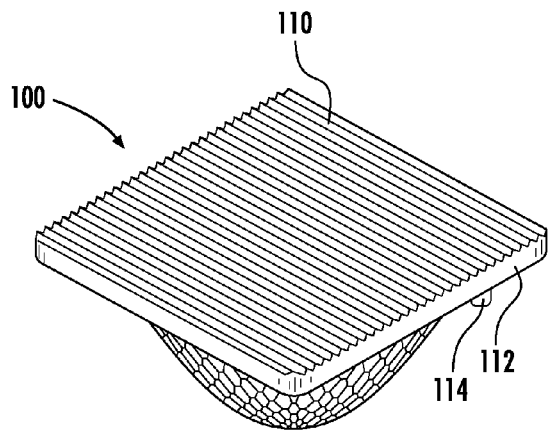
FIG. 1A illustrates a three-dimensional perspective view of the secondary optical lens in accordance with an exemplary embodiment.

FIGS. 1A through 1F illustrate multiple views of the secondary optical lens 100 in accordance with an exemplary embodiment. Specifically, FIG. 1A illustrates a three-dimensional perspective view of the secondary optical lens 100 comprising a light-emitting surface 110 having a flange 112 and a positioning pin 114 extending from the underside of the flange 112. As would be understood to one of skill in the art, the positioning pin 114 guides the second optical lens 100 during installation, for example, in a light bar mounting structure. In the exemplary embodiment, the light emitting surface 110, which can be considered a horizontal plane at the top of the lens surface, comprises a sinusoidal waveform stripe-texture.

Figure 1B:
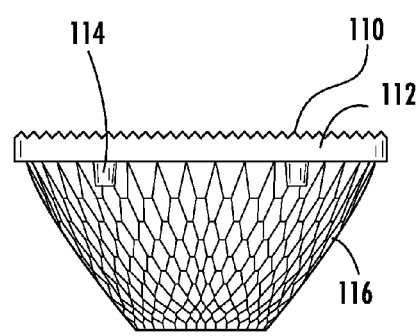
FIG. 1B illustrates a side view of the secondary optical lens pointing upwards in accordance with an exemplary embodiment.
Figure 1C:
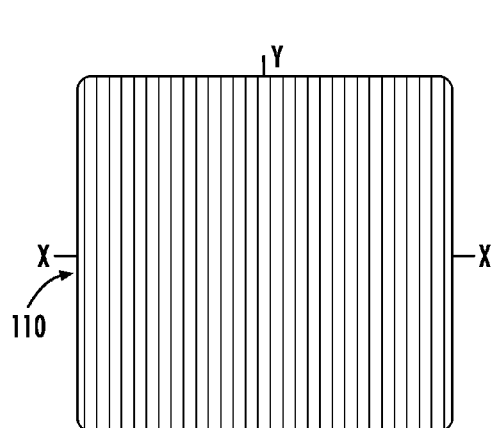
FIG. 1C illustrates a top plan view of a sinusoidal waveform stripe-texture of the light-emitting surface of the secondary optical lens in accordance with an exemplary embodiment.

More particularly, FIG. 1C illustrates a top plan view of the sinusoidal waveform stripe-texture of the light-emitting surface 110 of the secondary optical lens 100. The secondary optical lens 100 is shown in relation to the X and Y directions. It is contemplated that the X direction is parallel to the wall surface being illuminated and the Y direction is perpendicular to the wall surface being illuminated. For example, the illumination device having the secondary optical lens 100 may be mounted to the wall surface such that the light-emitting surface 110 is facing upward. In the exemplary embodiment, the sinusoidal waveform stripe-texture of the light-emitting surface 110 is configured to diffuse and distribute light beams in a direction perpendicular to the stripes (i.e., the X direction parallel to the wall surface). Moreover, the output light beams are preferably spread at range greater than 45° to 75° in the perpendicular direction to the stripes (i.e., the included angle to the Z direction at a range larger than that of approximately 22.5° to approximately 37.5°). In a further refinement of the exemplary embodiment, the total angle of diffusion is 75° (i.e., the divergence half-angle is ±37.5°).

Figure 1E:
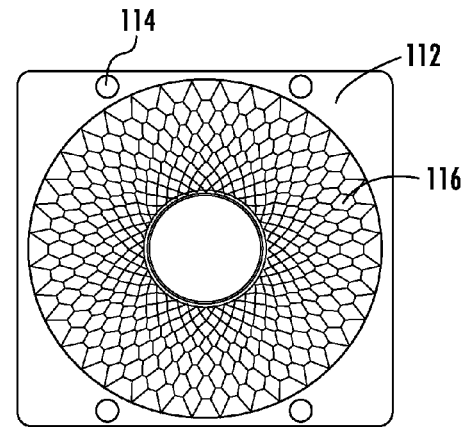
FIG. 1E illustrates a bottom plan view of the secondary optical lens in accordance with an exemplary embodiment.
Figure 1D:
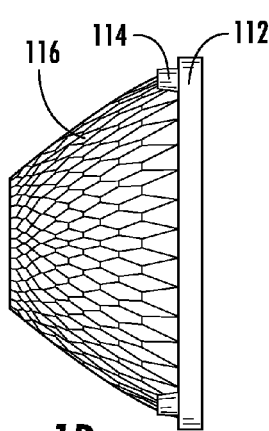
FIG. 1D illustrates a side view of the secondary optical lens pointing to the right in accordance with an exemplary embodiment.

FIG. 1B illustrates a side view of the secondary optical lens 100 in which the light emitting surface 110 is pointing upwards and FIG. 1D illustrates a side view of the secondary optical lens 100 in which the light emitting surface 110 is pointing to the right. As shown in both Figures, the secondary optical lens 100 includes a conically shaped reflection surface 116 have a diamond-textured flake pattern configured to reflect the light in the Z direction, as will be discussed in detail below with respect to FIG. 3.

FIG. 1E illustrates a bottom plan view of the secondary optical lens 100 showing the underside of the light emitting surface 110. As noted above, the secondary optical lens 100 includes positioning pins 114 on a flange 112. As shown in FIG. 1E, four positioning pins 114 are provided to guide the secondary optical lens 100 during installation. It should be appreciated that the secondary optical lens 100 may have any number of positioning pins or none at all.

Figure 1F:
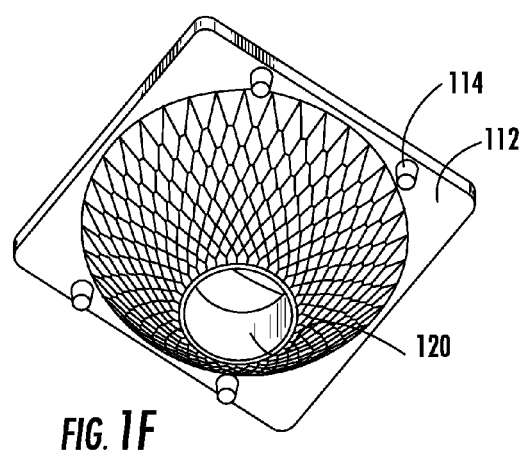
FIG. 1F illustrates a bottom perspective view of the secondary optical lens in accordance with an exemplary embodiment.

FIG. 1F illustrates a bottom perspective view of the secondary optical lens 100 in accordance with an exemplary embodiment. As will be discussed in more detail below, internal light incidence surface 120 extends upward as a cylindrical-shaped surface from the bottom or base plane and at the center of the secondary optical lens 100. In this regard, an LED can be positioned within and emit light to the light incidence surface 120.

Figure 2A:
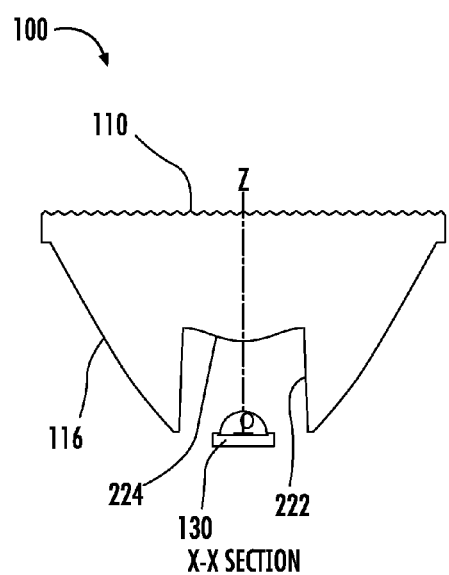
FIGS. 2A and 2B illustrate cross-sectional side views of the secondary optical lens in accordance with an exemplary embodiment.
Figure 2B:
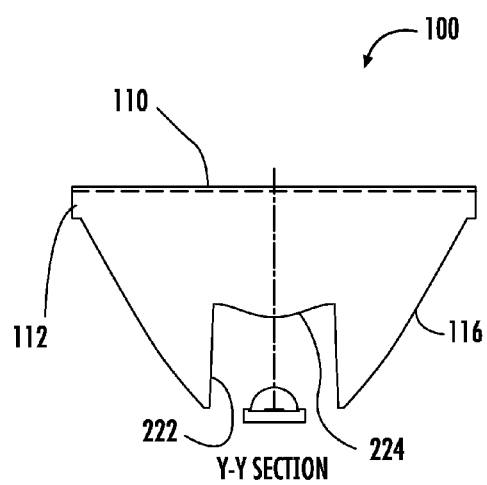

FIGS. 2A and 2B illustrate cross-sectional side views of the secondary optical lens 100 along the Y and X directions, respectively, in accordance with an exemplary embodiment. As noted above the secondary optical lens 100 includes the light emitting surface 110 and the flange 112. Moreover, as shown, the secondary optical lens 100 comprises the internal light incidence surface 120, which includes a cylindrical surface defining a cylindrical plane of incidence 222 extending in the Z direction and an aspheric plane of incidence 224 at the top of the cylindrical surface.

In the exemplary embodiment, the cylindrical plane of incidence 222 of the light incidence surface 120 preferably extends in the Z direction at a draft angle of between 1° and 7°, enabling the cylindrical plane of incidence 222 to collect light beams emitted from the LED at an angle of 30° to 90° from the optical axis, i.e., the Z direction, and to refract them to the outer reflection surface 116. Further, the outer reflection surface 116 having a diamond-textured flake pattern is configured to totally reflect the light beams refracted by the cylindrical plane of incidence 222 to the light emitting surface 110. This light reflection pattern is illustrated in detail below with respect to FIG. 3. Furthermore, the outer reflection surface 116 is preferably configured to mix light beams in a small angle range of approximately 3° to approximately 5°.

The aspheric plane of incidence 224 of the light incidence surface 120 is preferably configured to collect light beams emitted from the LED at an angle of 0° to 30° from the optical axis, i.e., the Z direction, and converge the light beams. In the exemplary embodiment, the converged light beams also fall as incident light beams on the light emitting surface 110 at the top of the secondary optical lens 100. This light reflection pattern is illustrated in detail below with respect to FIG. 5.

Figure 3:
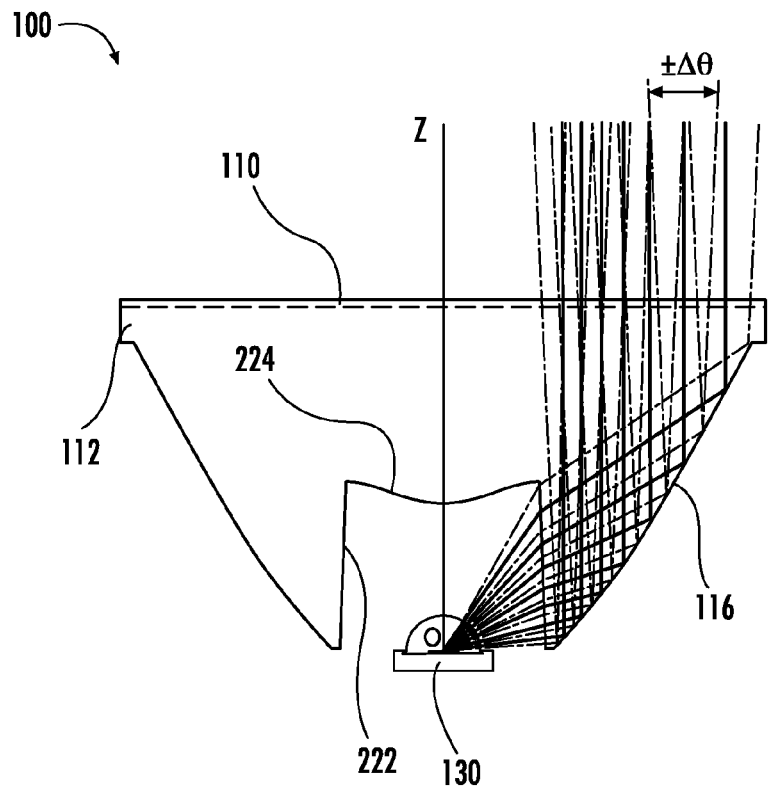
FIG. 3 illustrates the reflection collimating and small-angle light beam mixing effect of the secondary optical lens in accordance with an exemplary embodiment.

FIG. 3 illustrates the reflection collimating and small-angle light beam mixing effect of the secondary optical lens 100 in accordance with an exemplary embodiment. As shown, light beams emitted from the center point O of the light-emitting surface of an LED 130 at an angle of 30° to 90° from the optical axis are refracted from the cylindrical plane of incidence 222 of the light incidence surface 120 to the outer reflection surface 116. As shown, the diamond-textured flake pattern of the outer reflection surface 116 is configured to totally reflect and collimate the incident light beams in the Z direction. Further, the outer reflection surface 116 is configured to perform small-angle light beam mixing at the range of ±Δθ angle, which based on the different sizes of the flakes, in the range of ±3° to ±5°. As shown the reflected light beams fall as incident light beams on the light emitting surface 110 at the top of the lens, which are then diffused and distributed in the perpendicular direction to the stripes as discussed above.

Figure 4:
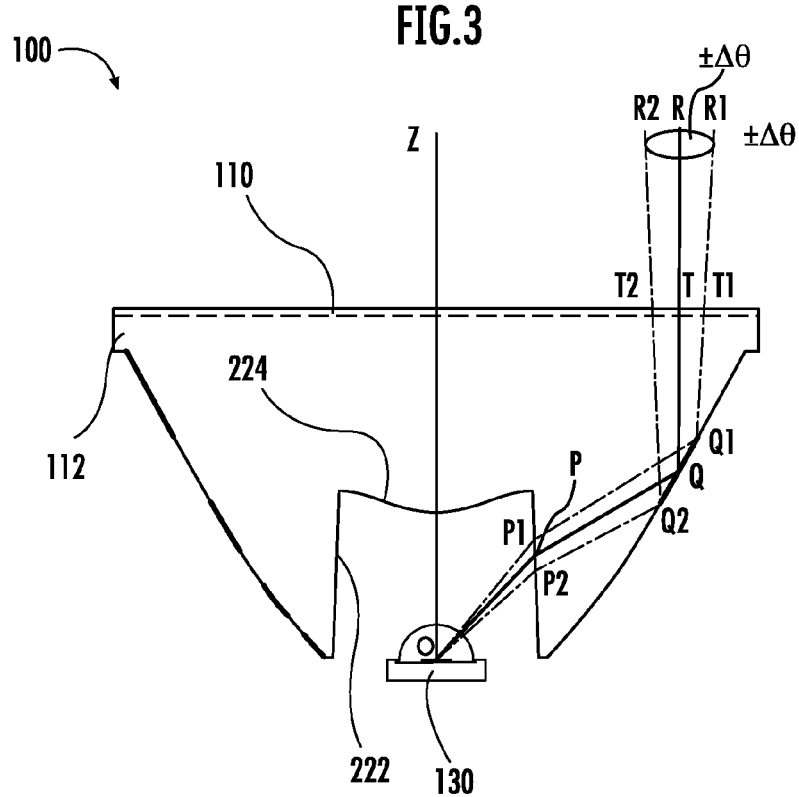
FIG. 4 illustrates the light beam mixing effect of a single diamond-texture flake of the light emitting surface in accordance with an exemplary embodiment.

FIG. 4 illustrates the light beam mixing effect of a single diamond-texture flake of the light emitting surface 110 in accordance with an exemplary embodiment. As shown, Q1-Q-Q2 are portrayed as an exemplary sectional contour line for the single diamond-texture flake plane in the Y direction. The light beam OP emitted from the center point O of the LED 130 falls as an incident light beam on the center point Q position of the flake after being refracted by the cylindrical plane of incidence 222 of the light incidence surface 120. Further, its emergent light TR after reflection is collimated and emitted in the Z direction (i.e., parallel to the optical axis OZ). Light beams OP1 and OP2, after refraction by the cylindrical plane of incidence 222, fall as incident light beams, respectively, on the upper and lower edge points Q1 and Q2 of the flake of the outer reflection surface 116. Moreover, because flake Q1-Q-Q2 is a facet of the outer reflection surface 116 with point Q as the center, after the reflected light beams from its edge positions Q1 and Q2 are emitted through the light emitting surface 110, the emergent edge light beams T1R1 and T2R2 will effectively have a small angle of diffusion ±Δθ. In the exemplary embodiment, with the secondary optical lens having a height between 0.5 mm and 5 mm, the flake plane will be smaller closer to the bottom of the lens and larger as they approach the top of the lens. In the exemplary embodiment, the size of the flake plane close to the bottom of the lens is approximately 0.7 mm and the size of the flake plane close to the top of the lens is approximately 2 mm. As a result, the emergent light beams can produce mixed light in the range of ±3° to ±5°. It is reiterated that the size of the optical secondary lens and flake planes are provided for exemplary purposes, but are in no way intended to limit the disclosure herein.

Figure 5:
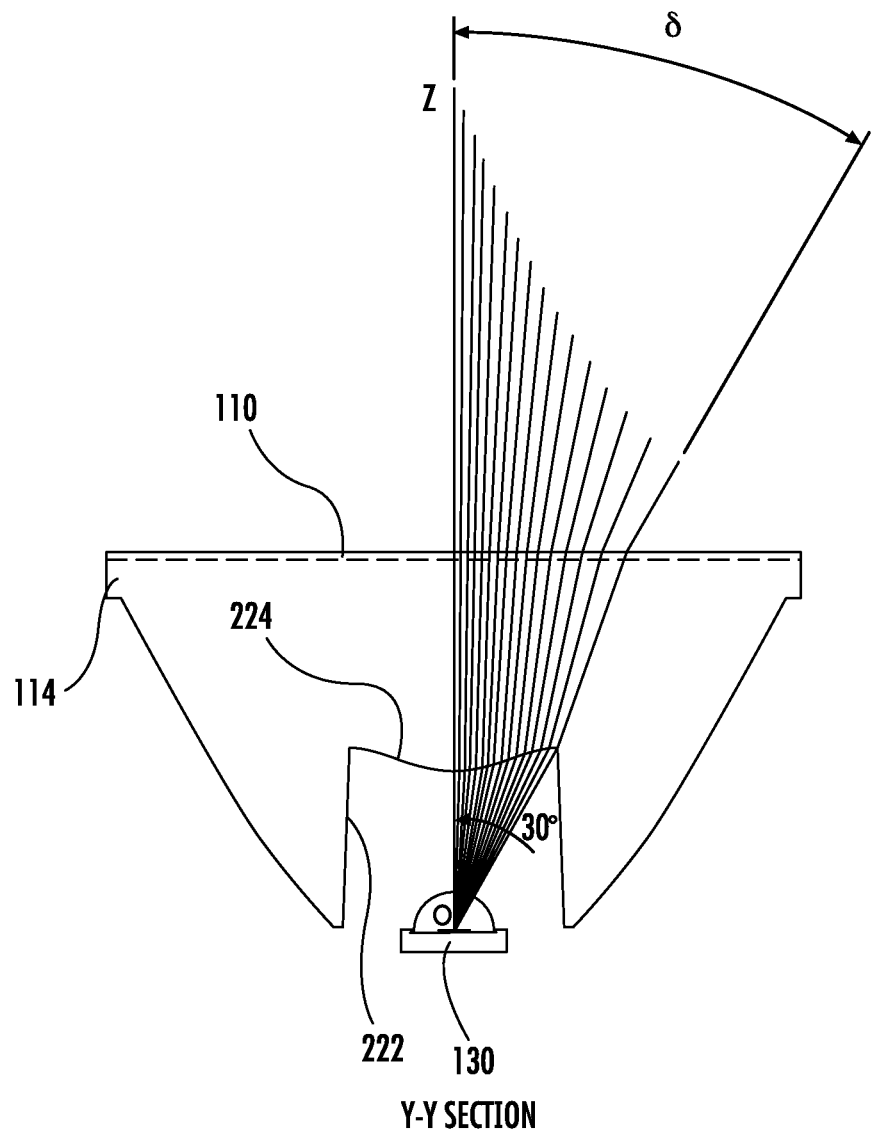
FIG. 5 illustrates the design principles of the aspheric plane of incidence of the light incidence surface in accordance with an exemplary embodiment.

FIG. 5 illustrates the design principles of the aspheric plane of incidence 224 of the light incidence surface 120 in accordance with an exemplary embodiment. It is contemplated that the light incidence surface 120 can be a smooth surface, a frosted surface, or a microlens array surface with light beam mixing effects. As shown, the light beams emitted from point O of the LED at an angle from 0° to 30° from the optical axis fall as incident light beams on the aspheric plane of incidence 224. Moreover, in the exemplary embodiment, the aspheric plane of incidence 224 is configured to allocate the output light beams at an angle in the range of 0 to δ°, which is advantageous over prior art designs. In particular, prior art designs having aspheric planes using collimation with a relatively small light beam angle for the emitted light beams, cause a light spot shadow (i.e., trumpet shaped shadow) at the lower part of the wall surface close to the light fitting and dark area outside the trumpet-shaped spot, resulting in a an imperfect wall wash effect. In contrast, by positioning the aspheric plane of incidence 224 at the central part of the bottom of the secondary optical lens 100 to distribute light as shown in FIG. 5, the aspheric plane of incidence 224 spreads the output light beams at an angle in the range of 0 to δ°, which effectively eliminates the trumpet-shaped light spot at the lower position of the wall surface close to the light fitting and at the same time, can compensate the relatively dark area outside the trumpet-shaped spot, such that a relatively uniform wall wash effects is obtained. In the exemplary embodiment, the δ angle is between 20° and 45°, and preferably 30°.

Figure 6:
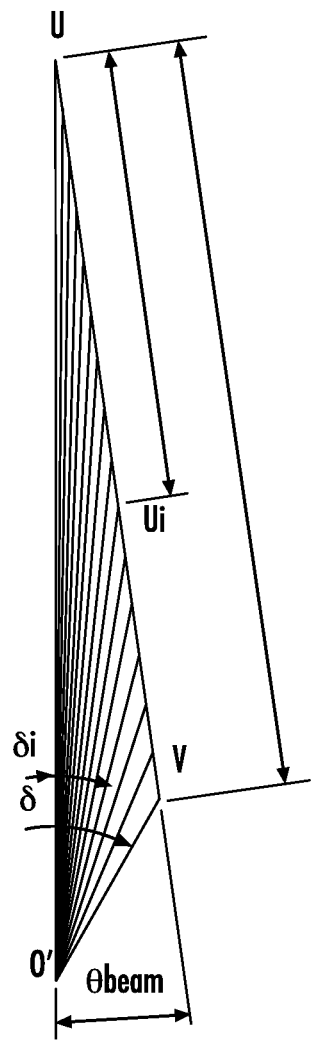
FIG. 6 illustrates the light distribution principle for the angle of incidence and the corresponding angle of emergence of the aspheric plane of incidence in accordance with an exemplary embodiment.

FIG. 6 illustrates the light distribution principle for the angle of incidence and the corresponding angle of emergence of the aspheric plane of incidence 224 of the light incidence surface 120 in accordance with an exemplary embodiment. The angle of incidence θ1 refers to the included angle in FIG. 5 between the light beam emitted from the center point O of the LED that falls as an incident light beam on the aspheric plane of incidence 224 and the optical axis OZ between the angle of 0° to 30° from the optical axis. As shown, $\theta_{beam}$ is the light beam angle emitted along the Y direction after being collimated through the outer reflection surface 116. In the exemplary embodiment $\theta_{beam}$ is at an angle in the range between 6° and 15°, preferably, 8°.

As further shown in FIG. 6, O' is an equivalent luminous point, and the triangle ΔO'UV is an equivalent light distribution triangle. As such, UV is an equivalent wall surface illumination target with an assumed length of 1, and its field angle size to point O' is δ (i.e., δ is the maximum angle of emergence for the emergent edge light beams passing through the light emitting surface 110. In the exemplary embodiment, the illumination target UV is, preferably evenly divided in the triangle ΔO'UV, and at the same time, the 0-30° angle of incidence is evenly divided, and the two are matched one to one. As a result, the field angle δi of the equal division point Ui relative to point O' is the angle of emergence for the i$^{th}$ light beam, and its corresponding incident light beam is the i$^{th}$ light beam emitted from the center point O of the LED 130. Assuming Ui is the i$^{th}$ equal division point on the illumination target, the length of UUi is θ1/30°. Based on the trigonometric function relationship for the equivalent distribution triangle ΔO'UV, the light distribution conditions can be easily obtained for the angle of incidence θ1 of the aspheric plane of incidence 224 and the angle of emergence δi of its output light beam:

$$\delta i = \tan^{-1}\left[\frac{\theta 1 \cdot \sin\delta \cdot \sin\theta\text{beam}}{30° \sin(\theta\text{beam} + \delta) - \theta 1 \cdot \sin\delta \cdot \cos\theta\text{beam}}\right]. \quad \text{(Formula 1)}$$

Based on the light distribution conditions of Formula 1, the (X,Y) coordinate values can calculated by one for the contour line of the aspheric plane of incidence 224 applying numerical calculation in combination with the principle of refraction.

Figure 7:
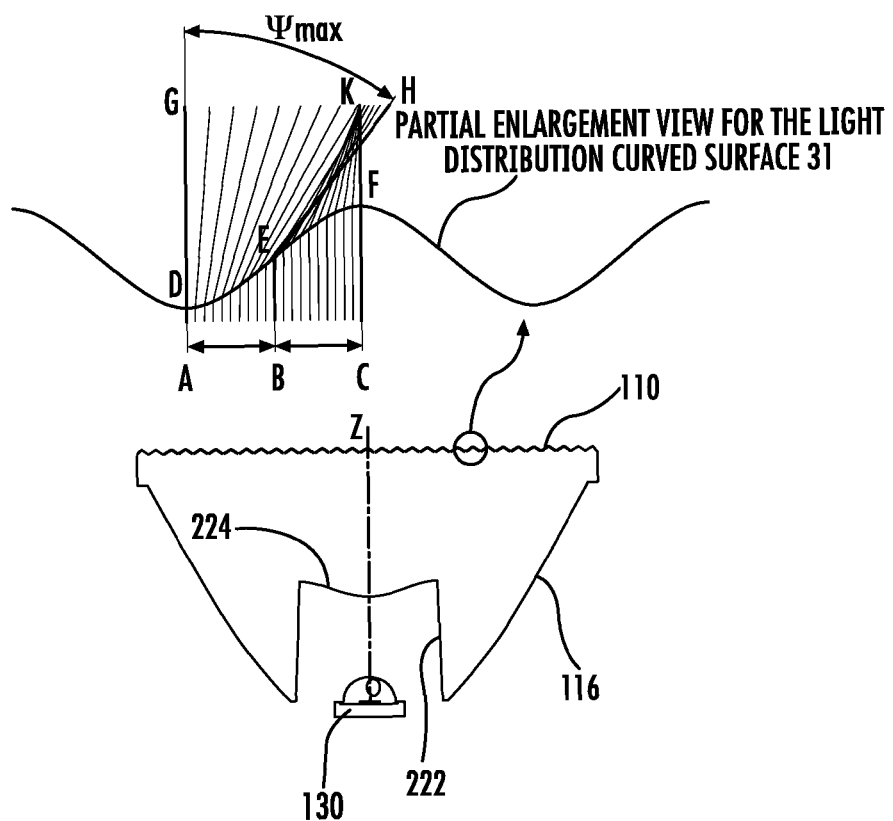
FIG. 7 illustrates the light distribution principle for the sinusoidal waveform stripe-texture of the light-emitting surface in accordance with an exemplary embodiment.

FIG. 7 illustrates the light distribution principle for the sinusoidal waveform stripe-texture the light-emitting surface 110 in accordance with an exemplary embodiment. As shown, the light-emitting surface 110 diffuses and distributes the incident light beams perpendicularly to the stripes of the surface, and the output light beams are spread at an angle within a range of $\pm\Psi_{max}$ to the optical axis OZ (i.e., a total angle is $2\Psi_{max}$). In the exemplary embodiment, the range is $45° \leq 2\Psi_{max} \leq 75°$.

As shown, the curved surface of the light-emitting surface 110 is a sinusoidal waveform light distribution curved surface. For illustration purposes, a quarter period of the sine wave is identified as the A-B-C interval. When a light beam falls at the lowest point (i.e., point D) or at the highest point (i.e., point F) of the quarter interval of the sine curve, the emergent light beams DG and FK are emitted parallel to the optical axis OZ, i.e., in the Z direction. When the light beam falls at the middle point (i.e., point E) that intersects the sine curve—this would be the one-eighth period position of the sine curve—the emergent light beam EH has the maximum divergence angle $\Psi_{max}$. Moreover, as shown, for the incident light beams at A-B and B-C intervals, the included angles between the emergent light beams thereof and the optical axis OZ are uniformly spread in the range of 0-$\Psi_{max}$ based on the corresponding proportion.

Figure 8:
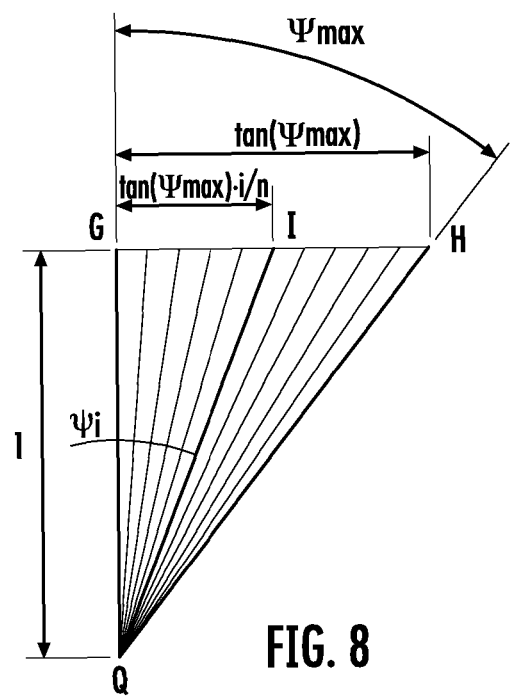
FIG. 8 illustrates the light distribution principle for an interval of the sine curve of the curved surface of the light-emitting surface in accordance with an exemplary embodiment.

FIG. 8 illustrates the light distribution principle for the A-B interval of the curved surface of the light-emitting surface 110 in an exemplary embodiment. It is noted that the A-B interval referred to here is illustrated in FIG. 7 and discussed above. As shown in FIG. 8, triangle ΔQGH is an equivalent distribution triangle, in which QG corresponds to the output light beam DG in FIG. 7, QH corresponds to the output light beam EH in FIG. 7, and point Q is the equivalent common luminous point for the output light beams DG and EH. Moreover, GH is the illumination target, and for purposes of the discussion, it is presumed that the illumination distance is normalized as QG=1, and the illumination target GH=tan ($\Psi_{max}$).

It should be appreciated that in the partial enlargement view for the light distribution of the light-emitting surface 110 shown in FIG. 7, the incident light beams at interval A-B are divided into n portions. Likewise, the illumination target GH as shown in FIG. 8 is divided into n portions that correspond to the n portions shown in FIG. 7. With regard to the i$^{th}$ incident light beam within interval A-B, the angle of emergence $\psi_i$ for its corresponding i$^{th}$ output light beam QI satisfies the following conditions:

$$\psi_i = \tan^{-1}\left(\frac{i}{n} \cdot \tan\psi_{max}\right). \quad \text{(Formula 2)}$$

Moreover, the light distribution principle for the B-C interval of the light-emitting surface 110 has, preferably, the same distribution principle as shown in FIG. 8, except that the sequence for the output light beam distribution angles is the reverse of that for A-B interval, and the incident light beams for the illumination target and for B-C interval are to be divided respectively into n portions as well. The angle of emergence for the i$^{th}$ light beam satisfies the following conditions:

$$\psi_i = \tan^{-1}\left(\frac{n-i}{n} \cdot \tan\psi_{max}\right). \quad \text{(Formula 3)}$$

Based on the light distribution conditions in Formula 2 and Formula 3, the contour line for the light distribution of the light-emitting surface 110 can be determined by numerical calculation, and it is a sinusoidal waveform. It should be appreciated that if the proportion between the amplitude and the period of the sine curve is fixed, the period size of the sine curve does not affect the angle of the output light beam. Moreover, if Poly(methyl methacrylate) ("PMMA") is used as the material for the secondary optical lens 100 in the exemplary embodiment, the maximum angle of emergence for the output edge light beam EH of the one-eighth period is $\Psi_{max}$=37.5°, and the sine wave amplitude/period proportion can be figured out to be 0.284. Preferably, in the exemplary embodiment, the preferred period for the two adjacent wave peaks (or wave valleys) of the sine curve is 0.75 mm. It should be understood that the disclosure herein should in no way be limited to these dimensions.

Figure 9:
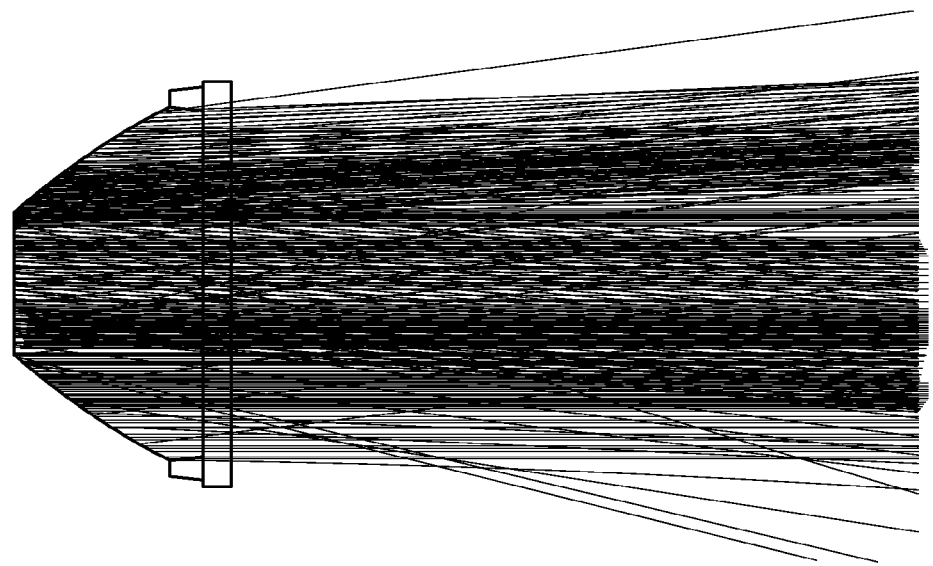
FIG. 9 illustrates a computer simulation of a ray tracing of the light beams emitted in the Y Direction by the secondary optical lens in accordance with an exemplary embodiment.
Figure 10:
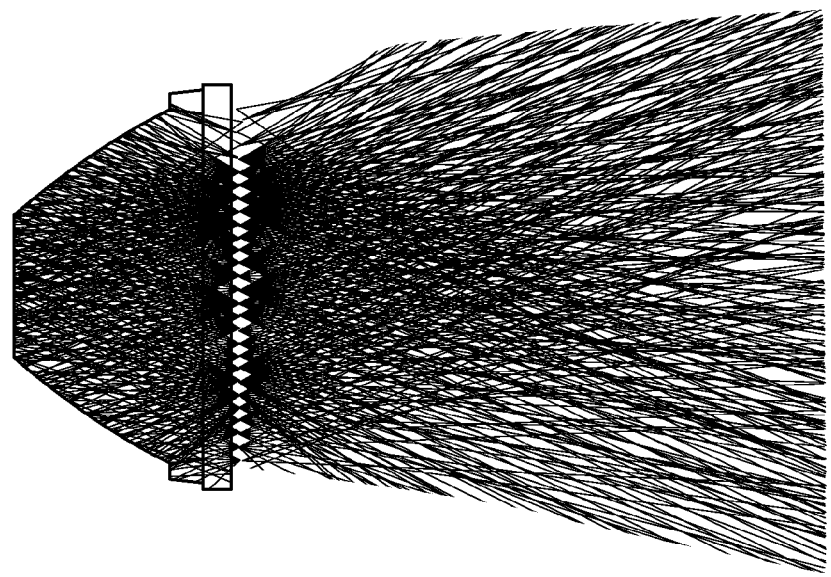
FIG. 10 illustrates a computer simulation of a ray tracing of the light beams emitted in the X Direction by the secondary optical lens in accordance with an exemplary embodiment.

FIGS. 9 and 10 illustrate computer simulations for the secondary optical lens 100 in accordance with an exemplary embodiment. For purposes of these simulations, it is assumed that an XLamp XP-E LED manufactured by Cree, Inc., is provided as the LED light source for the secondary optical lens 100 and that the luminous flux is 90 lumens.

In particular, FIG. 9 illustrates a computer simulation of a ray tracing of the light beams emitted in the Y Direction by the secondary optical lens 100 and FIG. 10 illustrates a computer simulation of a ray tracing of the light beams emitted in the X Direction by the secondary optical lens 100. As shown in FIG. 9, the emergent beams in the Y direction (i.e., the direction perpendicular to the wall surface) are substantially collimated and emitted, while the emergent beams in the X direction (i.e., the direction parallel to the wall surface) have a substantially large light beam angle. Accordingly, the light bar employing a plurality of secondary optical lenses 100 arranged linearly and having a small pitch angle, are capable of shedding all light beams on the wall surface to form a uniform light spot with a very large area of illumination and a very long distance of illumination.

For exemplary purposes, FIG. 11 illustrates a light spot shape emitted by the light bar having a plurality of secondary optical lenses 100 at a 3 meter range. As shown, the light spot distribution is a uniformly distributed line.

FIG. 12 illustrates an exemplary light intensity far-field angle distribution for the secondary optical lens 100. As shown, with regard to the light distribution curve for the 0 degree azimuth angle, the light beam angle is relatively large, and the shape of the curve looks somewhat like bat wings. Moreover, the width of the light beam angle at the one-half position of its peak light intensity is approximately ±37.5°, and it distributes light in the direction perpendicular to the lens stripes (i.e., the X direction). With regard to the light distribution curve for the 90 degree azimuth angle, the light beam angle is very small, and the curve is in Gaussian distribution, The width of the light beam angle at the one-half position of its peak light intensity is only approximately ±3°, and it distributes light in the direction parallel to the lens stripes (i.e., the Y direction).

Figure 13:
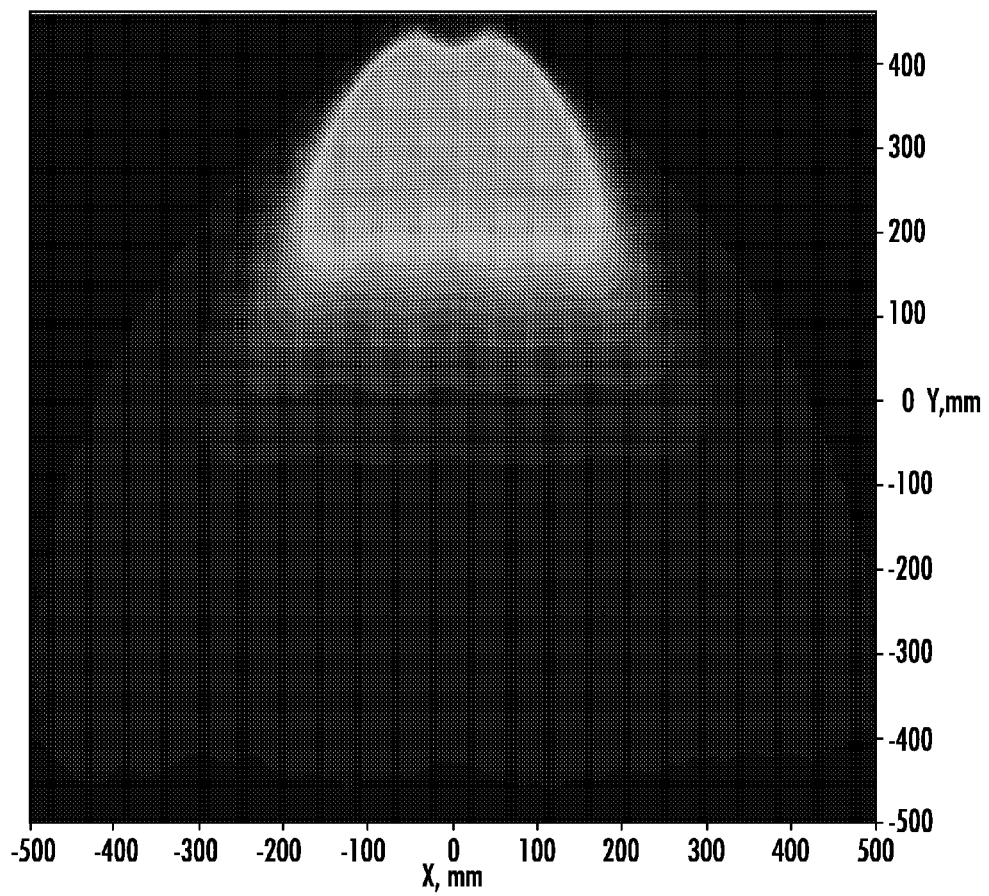
FIG. 13 illustrates a light spot shape on a screen parallel to the X Direction at the lateral face of the secondary optical lens in accordance with an exemplary embodiment.
Figures 14A, 14B:
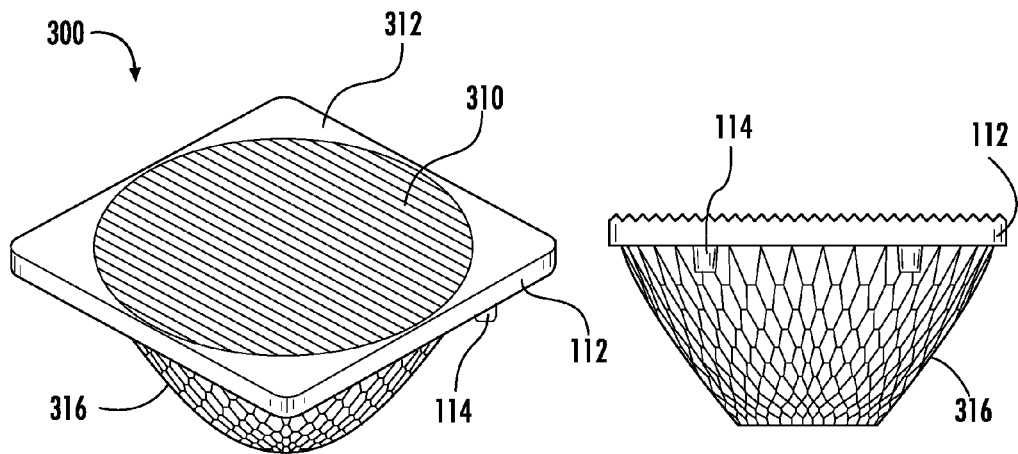
FIGS. 14A-14E illustrate various perspective views of an alternative embodiment of the secondary optical lens.
Figures 14C, 14E:
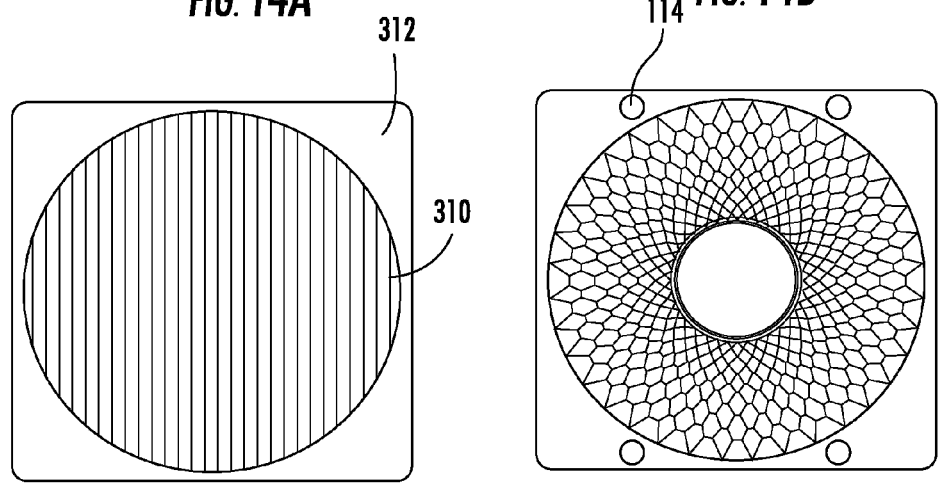
Figure 14D:
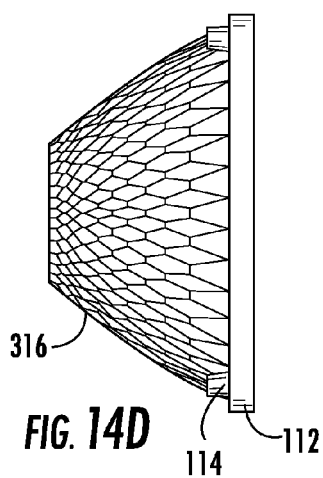
Figure 15A:
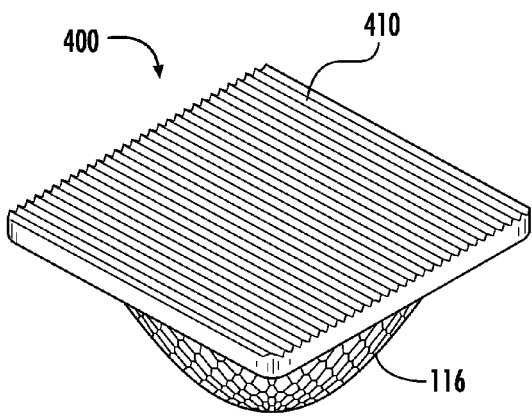
FIGS. 15A-15E illustrate various perspective views of an alternative embodiment of the secondary optical lens having an inclined light emitting surface.
Figure 15B:
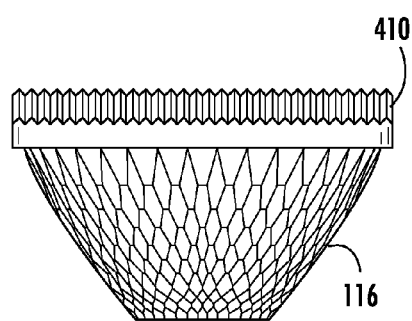
Figure 15C:
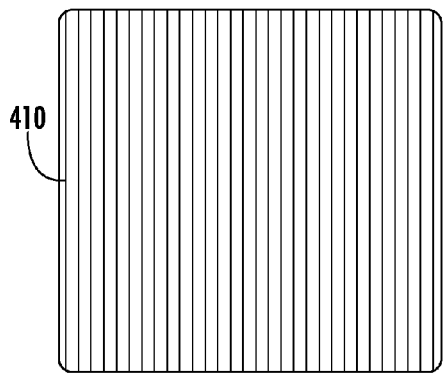
Figure 15E:
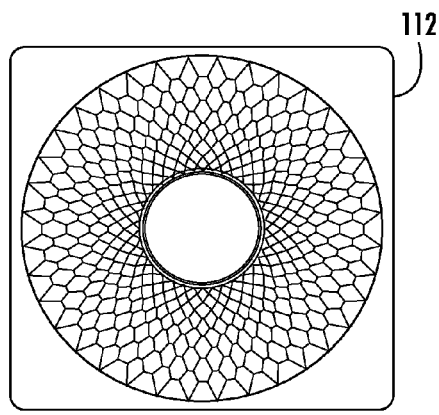
Figure 15D:
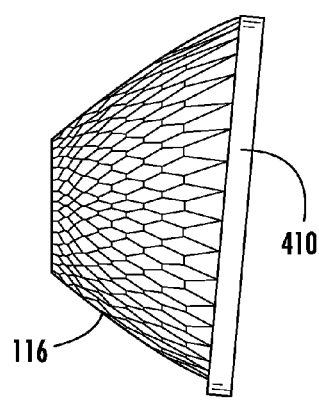

FIG. 13 illustrates a light spot shape on the screen parallel to the X Direction at the lateral face of the secondary optical lens 100. It is noted that the upper position is the lens position, which is inverted in comparison with practical application. As shown, at the lateral face of the secondary optical lens 100, a receiving screen is placed parallel to the X direction, which is intended to simulate the light spot distribution of the lens on the wall surface. The secondary optical lens 100 is positioned above the screen. As should be apparent, the light spot distribution on the screen is very wide—the spot uniformity is relatively good. Moreover, it should be appreciated that if a very small tilt angle is slightly adjusted, the spot uniformity on the screen will be even better. It is also contemplated that during manufacture of a light bar employing a plurality of secondary optical lens 100, the tilt angle of the light fitting can be adjusted based on the distance from the light fitting to the wall surface and on the height of the wall surface that is being illuminated. In general, it is contemplated that a tilt angle of between 5° and 8° can be employed for a wall surface with a height of 3-10 meters.

FIGS. 14A-14E illustrate various perspective views of an alternative embodiment of the secondary optical lens. In particular, it is contemplated that the secondary optical lens can have a light emitting surface with various shapes as long as the light emitting surface covers the size of the emergence aperture of the outer reflection surface below it. As shown in FIGS. 14A-14E, an secondary optical lens 300 includes a circular light-emitting surface 310 with a sinusoidal waveform stripe-texture. It should be understood that the diameter of the light-emitting surface 310 is greater than or equal to the outer reflection surface 316 below it. The plane surface 314 outside the external circular light-emitting surface 310 is the flange that is provided for assembly purposes. It is contemplated that the flange 314 may be provided in any shape based on assembly demand (e.g., square, hexagonal, round or the like). Apart from the features of the light-emitting surface 310 described herein, it should be appreciated that all other physical features of the secondary optical lens 300 are the same as those described above for the secondary optical lens 100 and will not be repeated herein.

Figures 16A, 16B:
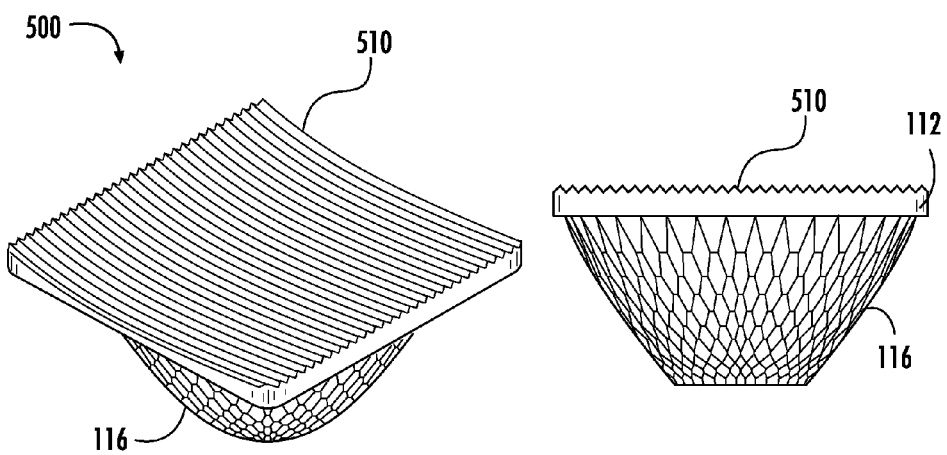
FIGS. 16A-16E illustrate various perspective views of an alternative embodiment of the secondary optical lens having a concave light emitting surface.
Figures 16C, 16E:
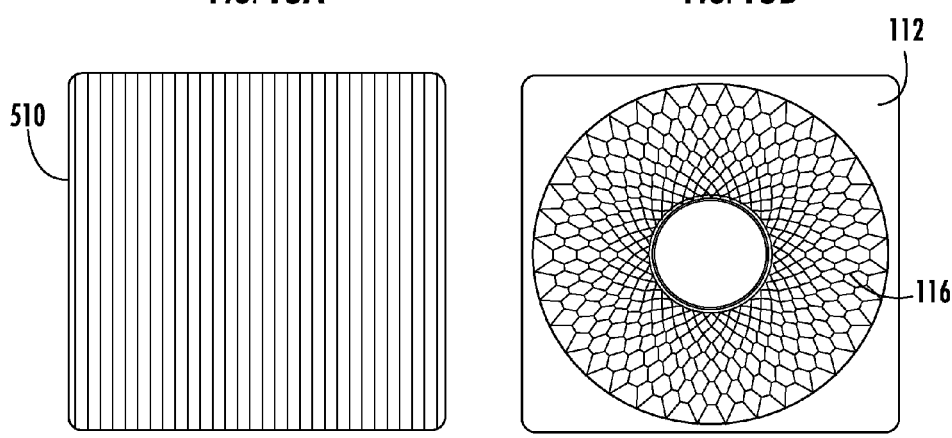
Figure 16D:
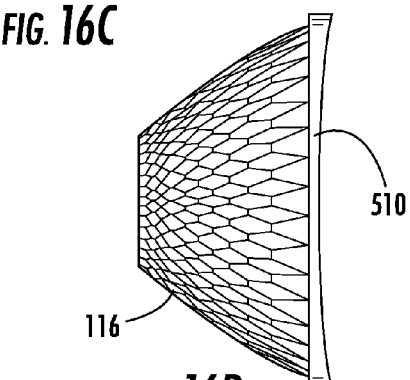
Figure 17A:
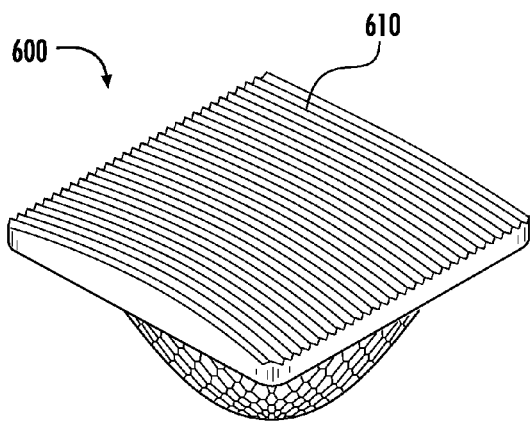
FIGS. 17A-17E illustrate various perspective views of an alternative embodiment of the secondary optical lens having a convex light emitting surface.
Figure 17B:
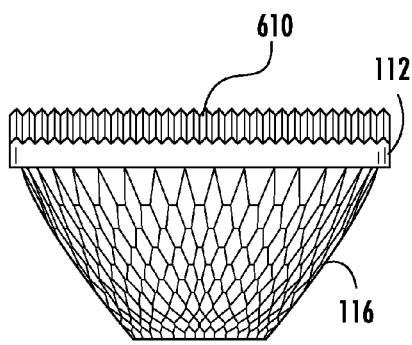
Figure 17C:
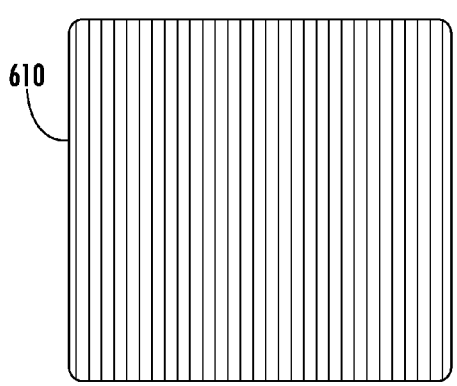
Figure 17E:
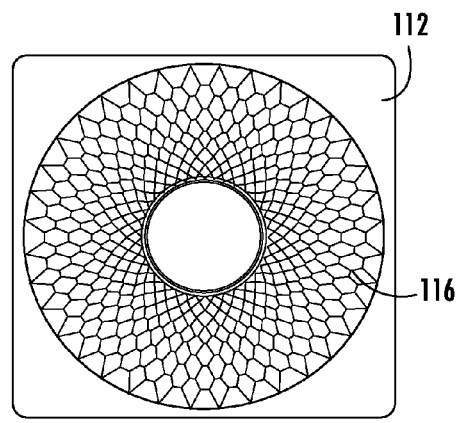
Figure 17D:
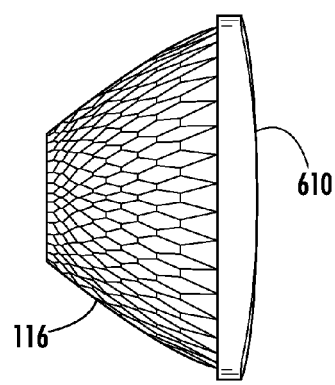

FIGS. 15A-15E, 16A-16E, and 17A-17E illustrate various perspective views of a other embodiments of the secondary optical lens. More particularly, FIGS. 15A-15E illustrate a secondary optical lens 400 having an inclined light emitting surface 410. This design can be implemented when the pitch angle cannot be adjusted for the light fitting. By inclining the light emitting surface 410, light beams emitted from the lens can be directed to the wall surface. In addition, if the light fitting is a relatively distance from the wall surface, or if the wall surface requires a specific illumination height, the light emitting surface can be designed having a cambered surface or a curved surface, such that the light beams can be allocated uniformly from the lens to the required height. FIG. 16 illustrate a secondary optical lens 500 having a light emitting surface 510 with a concave surface and FIG. 17 illustrate a secondary optical lens 600 having a light emitting surface 610 with a convex surface. Apart from the tilt angle or curvature of the light emitting surfaces illustrated in FIGS. 15A-15E, 16A-16E, and 17A-17E and described herein, it should be appreciated that all other physical features of these secondary optical lens 400, 500 and 600, respectively, are the same as those described above for the secondary optical lens 100 and will not be repeated herein.

Although specific embodiments have been illustrated and described herein, it will be appreciated by those of ordinary skill in the art that a variety of alternate and/or equivalent implementations may be substituted for the specific embodiments shown and described without departing from the scope of the present invention. This provisional application is intended to cover any adaptations or variations of the specific embodiments discussed herein. Therefore, it is intended that this invention be limited only by the claims and the equivalents thereof.

What is claimed is:

1. A secondary optical lens for use in LED wall wash lights, comprising:
   a concave body including an outer surface extending from a base plane to a top plane, the outer surface having a diamond-texture flake reflection pattern;
   a light incidence surface extending upward from the base plane of the concave body and having a cylindrical plane of incidence and an aspheric plane of incidence on top of the cylindrical plane of incidence; and
   a light emitting surface at the top plane of the concave body having sinusoidal waveform stripe-texture.

2. The secondary optical lens according to claim 1, further comprising a flange adjacent to the light emitting surface and having at least one positioning pin.

3. The secondary optical lens according to claim 1, wherein the cylindrical plane of incidence has draft angles in a range between 1° and 7° relative to the optical axis of the secondary optical lens.

4. The secondary optical lens according to claim 3, wherein the cylindrical plane of incidence is configured to collect light beams emitted from an LED, which is positioned below the aspheric plane of incidence, at an angle between 30° and 90° relative to the optical axis of the secondary optical lens, and further configured to refract the light beams to the outer surface.

5. The secondary optical lens according to claim 4, wherein the diamond-texture flake reflection pattern totally reflects the light beams and is configured to mix the light beams at the small angle range of ±3°-±5°.

6. The secondary optical lens according to claim 1, wherein the aspheric plane of incidence is configured to collect light beams emitted from an LED, which is positioned below the aspheric plane of incidence, at an angle between 0° and 30° relative to the optical axis of the secondary optical lens, and further configured to converge the light beams, and wherein the converged light beams fall as incident light beams on the light emitting surface.

7. The secondary optical lens according to claim 6, wherein the sinusoidal waveform stripe-texture of the light emitting surface diffuses and distributes the light beams perpendicularly to the stripes, and wherein the output light beams are spread at the range larger than 45° to 75°.

8. The secondary optical lens according to claim 1, wherein the outer surface having the diamond-texture flake reflection pattern is between 0.5 mm to 5 mm from the base plane to the top plane, and where each flake plane increases in size at positions closer to the top plane.

9. The secondary optical lens according to claim 1, wherein light beams emitted from a center point of an LED, which is positioned below the aspheric plane of incidence, fall as incident light beams on a center point position of a flake of the diamond-texture flake reflection pattern after passing through the cylindrical plane of incidence, and wherein emergent light after reflection is collimated and emitted in a direction parallel to the optical axis of the secondary optical lens.

10. The secondary optical lens according to claim 9, wherein additional light beams refracted by the cylindrical plane of incidence fall as additional incident light beams, respectively, on upper and lower edge points of a flake of the diamond-texture flake reflection pattern, and wherein emergent light beams after reflection have an angle of diffusion between approximately 3° and 5°.

11. The secondary optical lens according to claim 1, wherein the aspheric plane of incidence is configured to distribute light beams emitted from an LED, which is positioned below the aspheric plane of incidence, in a range of 0° and 45°.

12. The secondary optical lens according to claim 1, wherein the aspheric plane of incidence comprises one of a smooth surface, a frosted surface, or a microlens array surface with light beam mixing effects.

13. The secondary optical lens according to claim 1, wherein the aspheric plane of incidence comprises an angle of incidence θ1 and a corresponding angle of emergence δi that satisfy the following conditions:

$$\delta i = \tan^{-1}\left[\frac{\theta 1 \cdot \sin\delta \cdot \sin\theta \text{beam}}{30° \ \sin(\theta\text{beam} + \delta) - \theta 1 \cdot \sin\delta \cdot \cos\theta\text{beam}}\right].$$

14. The secondary optical lens according to claim 1, wherein the stripe-texture of the light emitting surface has a light distribution principle in which for an $i^{th}$ incident light beam within a first one-eighth period of the sine wave, the angle of emergence ψi for a corresponding $i^{th}$ output light beam satisfies the following distribution conditions:

$$\psi_i = \tan^{-1}\left(\frac{i}{n} \cdot \tan\psi_{max}\right).$$

15. The secondary optical lens according to claim 1, wherein the stripe-texture of the light emitting surface has a light distribution principle in which for an $i^{th}$ incident light beam within a second one-eighth period of the sine wave, the angle of emergence ψi for a corresponding $i^{th}$ output light beam satisfies the following distribution conditions:

$$\psi_i = \tan^{-1}\left(\frac{n-i}{n} \cdot \tan\psi_{max}\right).$$

16. The secondary optical lens according to claim 14 or claim 15, wherein the angle of emergence ψi is in range of 45°≤2Ψmax≤75°.

17. The secondary optical lens according to claim 2, wherein the flange is square, hexagonal or round.

18. The secondary optical lens according to claim 1, wherein the light emitting surface is inclined with respect to the top plane.

19. The secondary optical lens according to claim 1, wherein the light emitting surface is concave with respect to the top plane.

20. The secondary optical lens according to claim 1, wherein the light emitting surface is convex with respect to the top plane.

* * * * *